United States Patent [19]
Lenard et al.

[11] Patent Number: 5,326,954
[45] Date of Patent: Jul. 5, 1994

[54] PROCESS AND MACHINE FOR THE ELECTRIC DISCHARGE MACHINING OF CUTTER PLATES

[75] Inventors: Peter Lenard, Biberach/Riss; Norbert Bailer, Schemmerhofen, both of Fed. Rep. of Germany

[73] Assignee: Vollmer Werke Maschinenfabrik GmbH, Fed. Rep. of Germany

[21] Appl. No.: 958,109
[22] PCT Filed: May 8, 1992
[86] PCT No.: PCT/EP92/01008
   § 371 Date: Dec. 23, 1992
   § 102(e) Date: Dec. 23, 1992
[87] PCT Pub. No.: WO92/19410
   PCT Pub. Date: Nov. 12, 1992

[30] Foreign Application Priority Data
May 8, 1991 [DE] Fed. Rep. of Germany ....... 4115107

[51] Int. Cl.$^5$ ................................ B23H 7/10
[52] U.S. Cl. ................ 219/69.12; 219/69.17
[58] Field of Search ........... 219/69.12, 69.17, 69.16; 407/30

[56] References Cited

U.S. PATENT DOCUMENTS

| | | | |
|---|---|---|---|
| 4,301,349 | 11/1981 | Inoue | 219/69.12 |
| 4,490,600 | 12/1984 | Rae | 219/69.12 |
| 4,673,787 | 6/1987 | Inoue | 219/69.12 |
| 4,841,126 | 6/1989 | Graeber | 219/69.2 |
| 4,851,633 | 7/1989 | Bühler | 219/69.12 |
| 4,960,971 | 10/1990 | Kawanabe | 219/69.12 |
| 4,983,078 | 1/1991 | Unozawa | 407/30 |
| 5,014,421 | 5/1991 | Swarden et al. | 219/69.17 |

FOREIGN PATENT DOCUMENTS

| | | | |
|---|---|---|---|
| 3128403 | 8/1990 | Fed. Rep. of Germany . | |
| 56-76340 | 6/1981 | Japan | 219/69.12 |
| 62-176716 | 8/1987 | Japan | 219/69.12 |
| 62-292315 | 12/1987 | Japan | 219/69.12 |
| 837709 | 6/1981 | U.S.S.R. | 219/69.12 |
| 2062526 | 5/1981 | United Kingdom . | |

OTHER PUBLICATIONS

"Fein-Schneiderrodieren beliebiger Profile," Werkstatt und Betrieb, 117 (1984) vol. 4, p. 216.

*Primary Examiner*—Geoffrey S. Evans
*Attorney, Agent, or Firm*—Woodard, Emhardt, Naughton, Moriarty & McNett

[57] ABSTRACT

For the electric discharge machining of cutter plates (60) by means of an electrode wire (50) a respective cutter plate (60) is rotated under program control about a workpiece axis (A) and is adjusted rectilinearly with respect to the electrode wire (50) along at least one of three axes (X, Y, Z) of a rectangular coordinate system, among them one axis (X) which is parallel to the workpiece axis (A). During the machining of a flank (64) adjacent a cutting edge (66), the cutter plate (60) is rotated in such manner about the workpiece axis (A) that the point at which the electrode wire (50) intersects the cutting edge (66) always lies on a tool axis (E) which extends at right angles to the electrode wire (50) and to two axes (X, Y) of the coordinate system. During the machining of portions of the flank (64) which are located adjacent portions of the cutting edge (66) not in parallel with the workpiece axis (A), the electrode wire (50) is rotated about the tool axis (E).

3 Claims, 4 Drawing Sheets

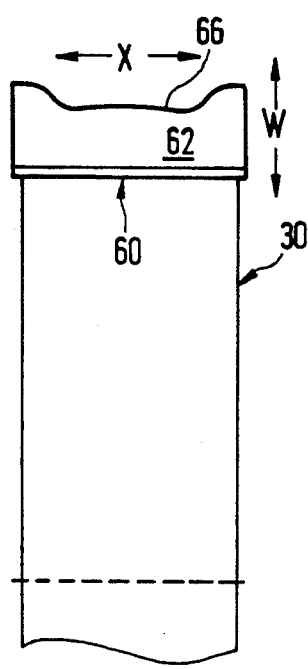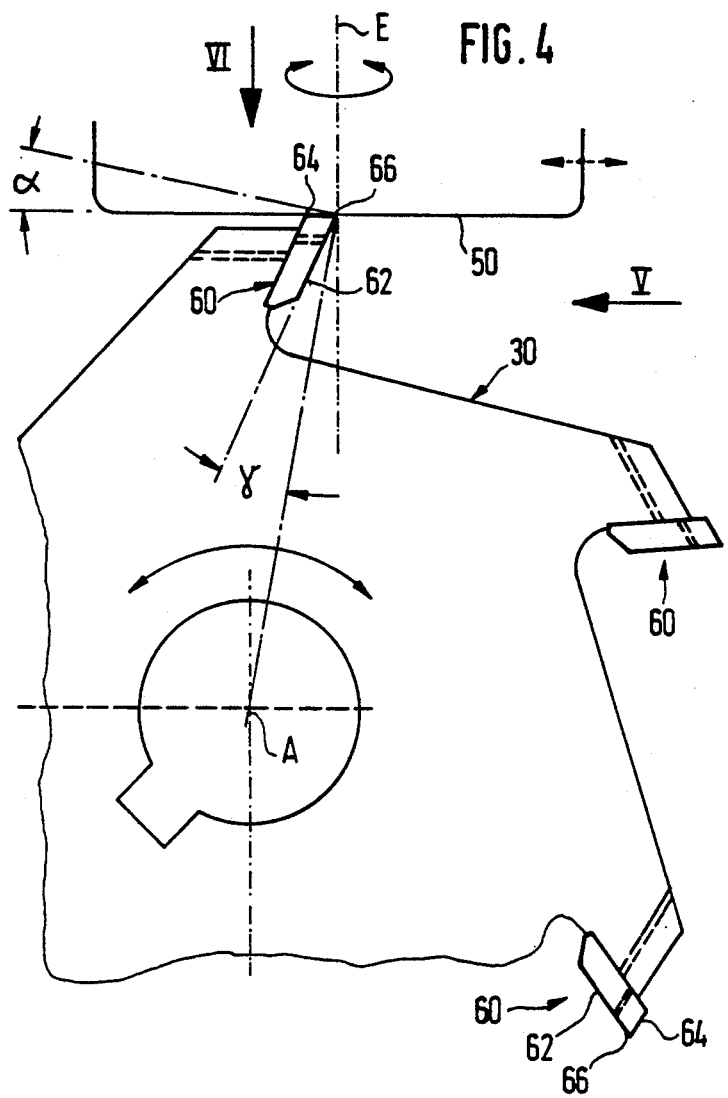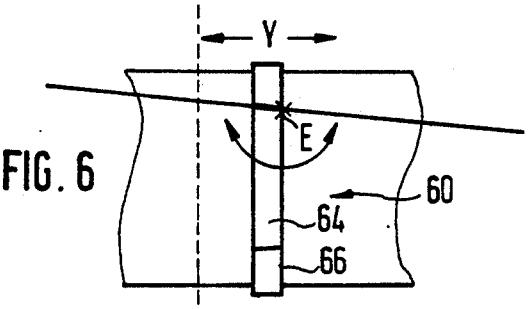

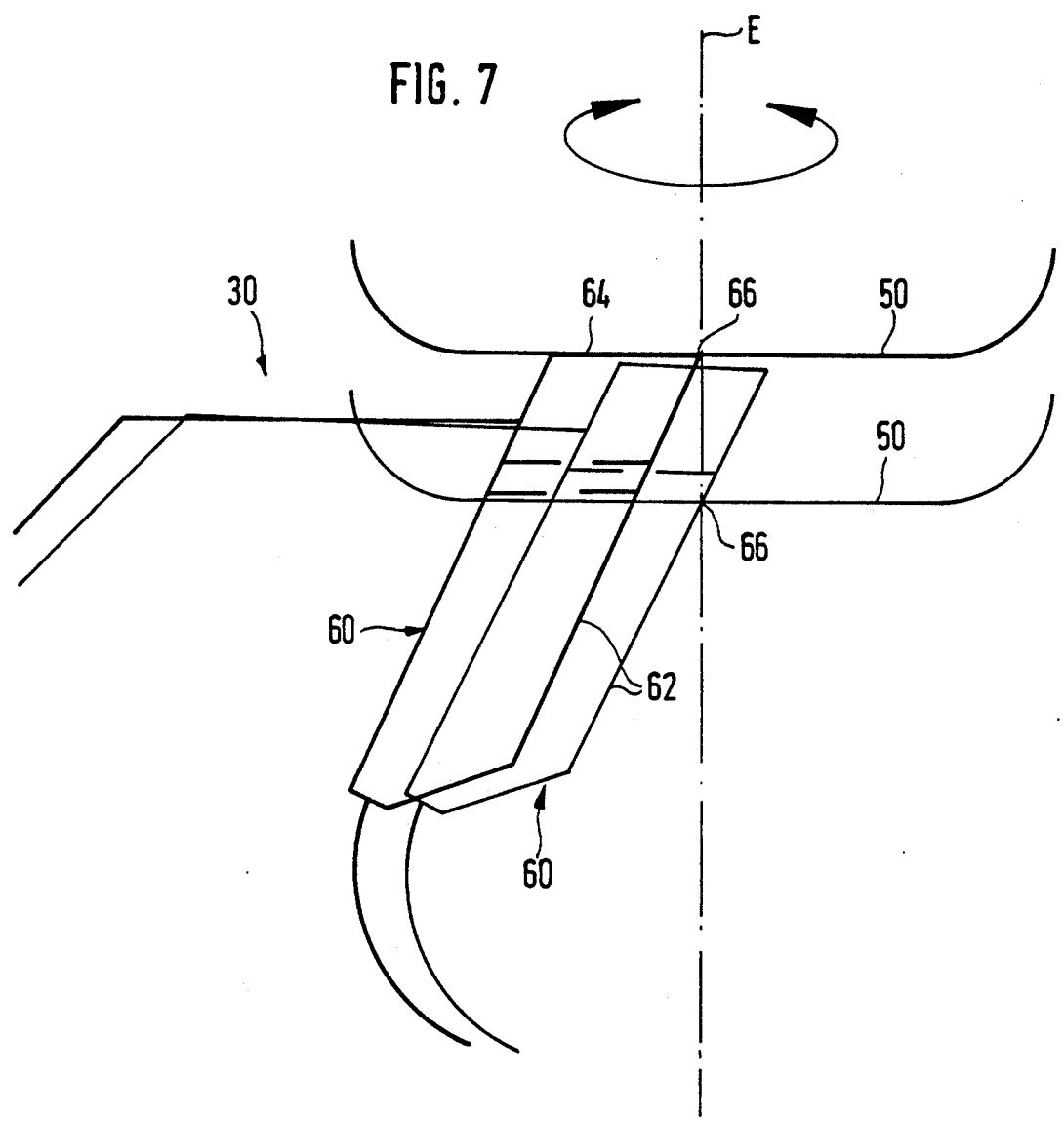

PROCESS AND MACHINE FOR THE ELECTRIC DISCHARGE MACHINING OF CUTTER PLATES

The invention relates to an electric discharge machining process for finishing cutter plates by means of an electrode wire, wherein a respective cutter plate is rotated under program control about a workpiece axis and is adjusted rectilinearly with respect to the electrode wire along at least one of three axes of a rectangular coordinate system, among them one axis which is parallel to the workpiece axis.

The invention further relates to a machine for electric discharge machining of cutter plates, comprising
  a mount for at least one cutter plate,
  a program controlled motor for rotating the cutter plate about a workpiece axis,
  a wire fixture over which an electrode wire is guided, and
  a carriage arrangement with program controlled drives for rectilinear relative movements between the cutter plate and the electrode wire along the three axes of a rectangular coordinate system.

Cutter plates with the machining of which for purposes of making or sharpening them the invention is concerned are soldered or clamped, for example, to milling or lathe tools. They may be designed as reversible plates and thus have a plurality of cutting edges adapted to be moved into operating position one after the other. Milling cutters above all for working on plates, boards, or strips of wood or plastics often are furnished with cutting plates which have complicated contours and require considerable expenditure in terms of control and programming to be machined according to known methods and with known machines in order to make sure that the most favorable front clearance angles and cutting angles are observed at all the flanks and machining surfaces, respectively, adjacent the cutting edges of such cutter plates. Trade-offs often had to be made in dimensioning these angles in view of the high programming expenditure involved, and the cutting performance and service life of the cutter plates were affected unfavorably by them.

It is, therefore, the object of the invention to improve a process and a machine for electric discharge machining of cutter plates such that the most favorable angles, especially front clearance angles can be observed accurately and with but little programming and control expenditure even for complicated cutter plate contours.

As regards the process, this object is met, starting from a process of the kind specified initially, in that according to the invention the cutter plate is rotated in such manner about the workpiece axis, during the machining of a flank adjacent a cutting edge, that the point at which the electrode wire touches the cutting edge always lies on a tool axis which extends at right angles to the electrode wire and to two axes of the coordinate system.

In this context it is especially advantageous if the electrode wire is rotated about the tool axis during the machining of portions of the flank which are located adjacent portions of the cutting edge not in parallel with the workpiece axis.

The rotation about the tool axis makes it possible to keep the front clearance angle of a cutter plate constant, as measured in a plane at right angles to the workpiece axis, even if the cutting edge extends at different radial spacings from the workpiece axis. The provision of the tool axis at right angles to the workpiece axis and the circumstance of the workpiece axis passing through the cutting edge result in distortion-free machining even of lateral flanks whose front clearance angle is measured in a plane parallel to the workpiece plane.

Inasmuch as the object of the invention relates to a machine, it is met according to the invention, starting from a machine of the kind mentioned initially, in that the wire fixture is rotatable under program control about a tool axis which extends at right angles to the electrode wire and to two axes of the coordinate system.

The machine according to the invention conveniently is developed further in that the wire fixture is disposed on a rotary member which is rotatable about the tool axis and further carries a sensor for measuring contours and surfaces of the cutter plate.

An embodiment of the invention will be explained in greater detail below, with reference to diagrammatic drawings, in which:

FIG. 4 shows a sector of a workpiece during machining;

FIG. 5 is the view in the direction of arrow V in FIG. 4;

FIG. 6 is the view in the direction of arrow VI in FIG. 4; and

FIG. 7 is an enlarged cutout of FIG. 4.

Figure 1:
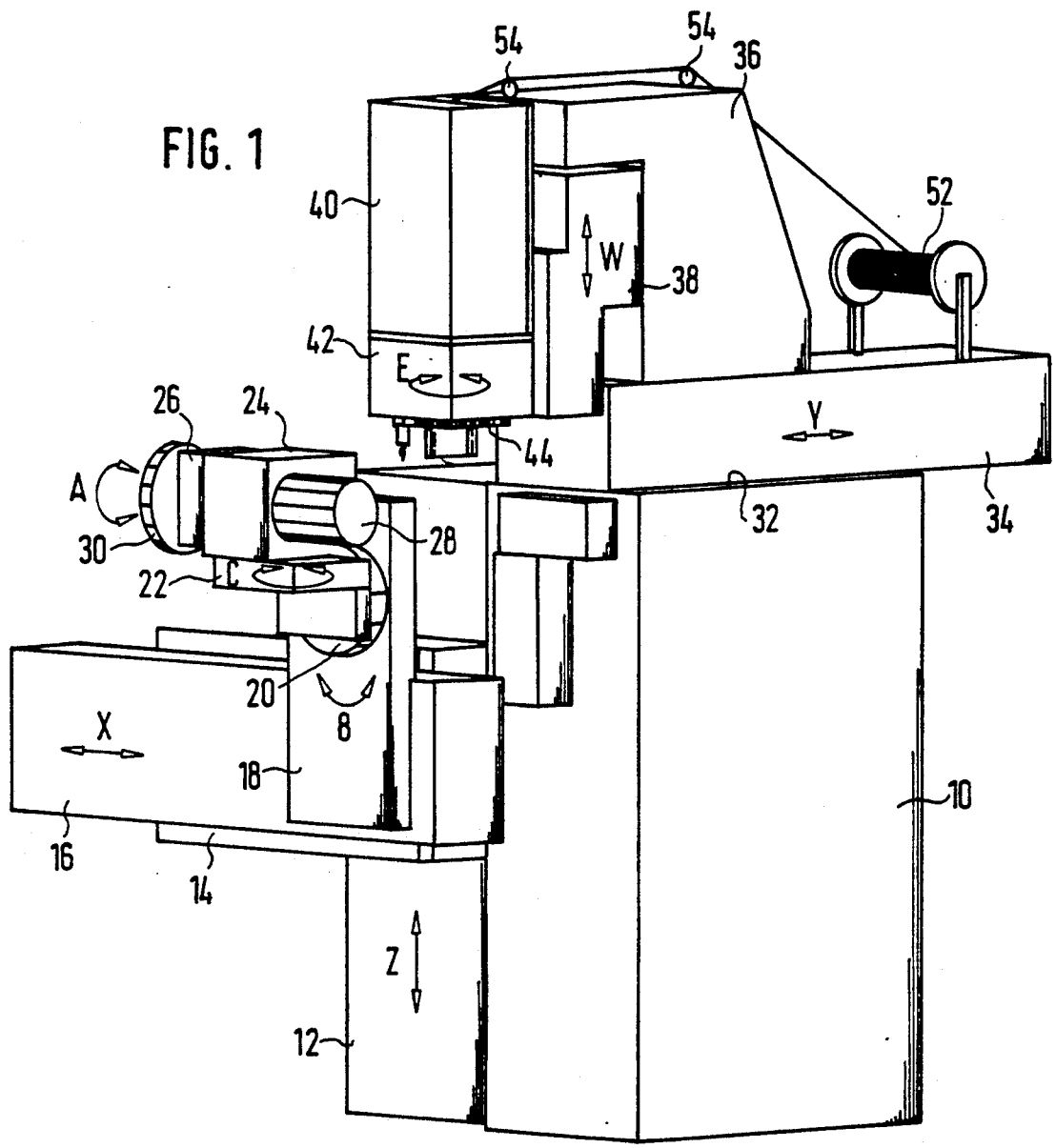
FIG. 1 is an oblique view of a machine according to the invention for electric discharge machining of cutter plates.
Figure 2:
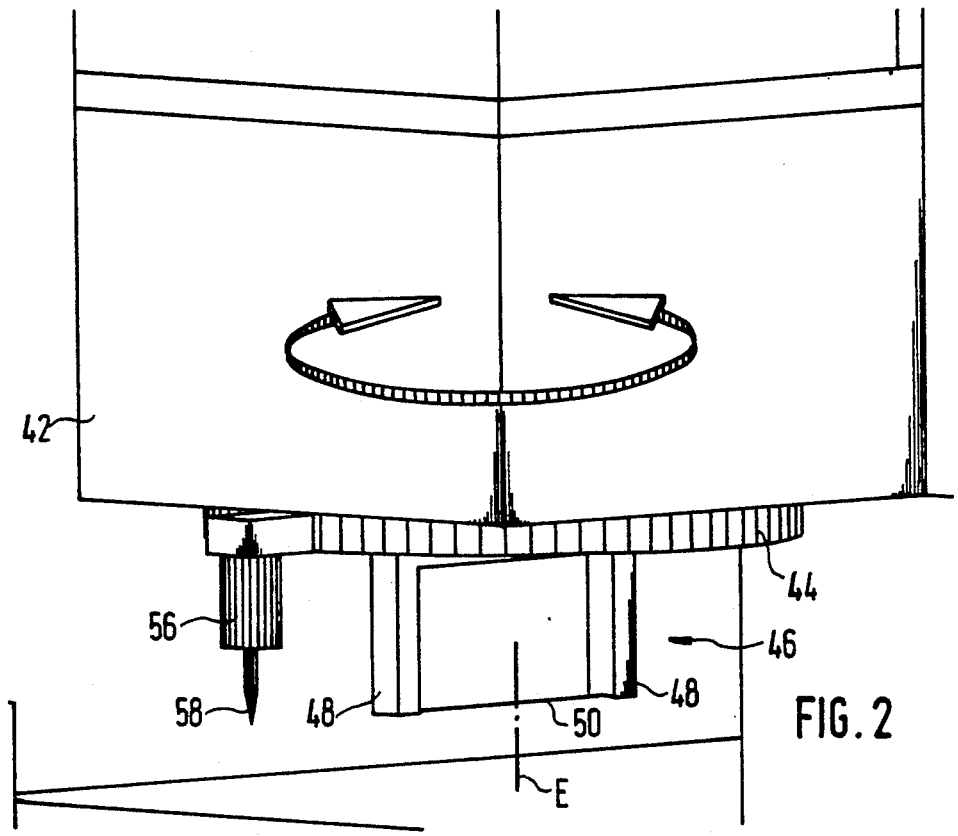
FIG. 2 is an enlarged cutout of FIG. 1 showing the machine in an operating position.
Figure 3:
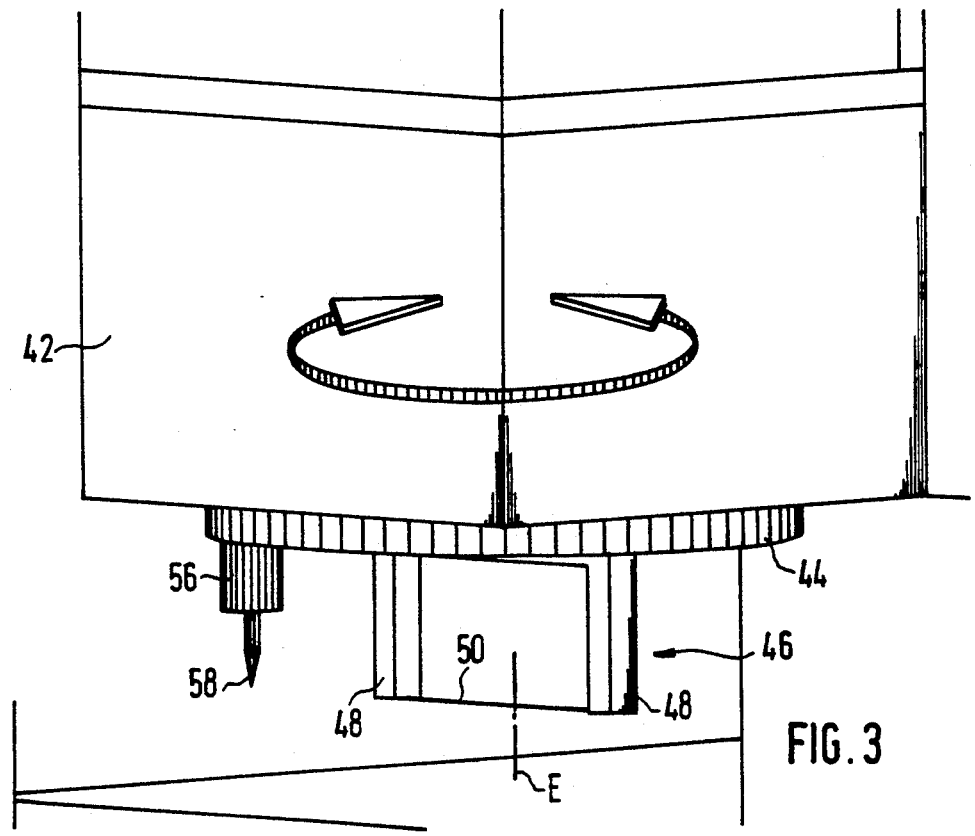
FIG. 3 is the same cutout, showing the machine in a measuring position.

The machine illustrated in FIGS. 1 to 3 comprises a machine bed 10 provided with a vertical guide means 12 on which a carriage 14 is guided for displacement in the direction of a Z axis. The carriage 14 is formed with a horizontal guide means 16 on which a carriage 18 is guided for displacement along an X axis. The carriage 18 is formed with a rotary bearing 20 which supports a bracket 22 so that it can be rotatably adjusted about a B axis which is perpendicular to the X and Z axes. A casing 24 is supported on the bracket 22 so as to be rotatably adjustable about a C axis which is parellel to the Z axis. The casing 24 supports a mount 26 for rotational adjustment about an A axis which intersects the C axis at right angles, the mount being adapted to be driven by a motor 28. The mount 26 carries a workpiece 30, embodied by a milling tool in the embodiment illustrated.

The machine bed 10 further is formed with a horizontal guide means 32 adapted to guide a carriage 34 for displacement in the direction of a Y axis which extends at right angles with respect to the X and Z axes. The carriage 34 supports a pedestal 36 formed with a vertical guide means 38 for a carriage 40 which is displaceable along a vertical W axis. The carriage 40 carries a casing 42 which supports a rotary member 44 for rotational adjustment about a vertical tool axis E.

The rotary member 44 carries a fork-like wire fixture 46 which is open towards the bottom and has two vertical limbs 48 between which an electrode wire 50 is held tight in horizotnal direction. The electrode wire 50 is withdrawn incrementally or continuously from a bobbin 52, it passes over pulleys 54, and is connected to one pole of a power source. The workpiece 30 is connected to the other pole.

Laterally offset from the wire fixture 46, a sensor 56 is fastened to the rotary member 44, and its tip 58 is suited for scanning a cutter plate 60. The rotary member 44 adopts the position illustrated in FIG. 3 for measuring; the position shown in FIG. 2 is provided for electric discharge machining by means of the electrode wire 50. This position is rotated through 90° with respect to the measuring position.

All the drives for all the carriages mentioned and all the rotary drive means are program controlled by a computer which also processes the results of the measurements made by the sensor 56.

The workpiece 30 illustrated in FIGS. 4 to 7 is furnished with a plurality of cutter plates 60, each of them having a machining surface 62 and a flank 64 which together present a cutting edge 66 of crown type profile in the embodiment shown.

The flank 64 has a front clearance angle e which is the optimum in all its areas and constant at least in the area of each cutter plate 60 remote from the workpiece axis A; the machining surface 62 has a constant cutting angle γ.

In FIG. 7 a cutter plate 60 is illustrated in thick lines in a position in which an area far remote from the workpiece axis A of the cutter plate flank 64 is being machined by the electrode wire 50. The thin lines illustrate the same cutter plate 60 in a position in which an area of its flank 64 much closer to the workpiece axis A is being machined. The two positions presented in the drawing result from each other by rotating the workpiece 30 about the workpiece axis A without the workpiece axis A itself having to change its position. In both cases it is assured that the particular point of the cutting edge 66 on which the electrode wire 50 is working at a particular instant lies on the tool axis E.

What is claimed is:

1. An electric discharge machining process for finishing cutter plates (60) by means of an electrode wire (50), wherein a respective cutter plate (60) is rotated under program control about a workpiece axis (A) and is adjusted rectilinearly with respect to the electrode wire (50) along at least one of three axes (X, Y, Z) of a rectangular coordinate system, among them one axis (X) which is parallel to the workpiece axis (A), characterized in that, for machining a cutter plate (60) having a cutting edge (66) parts of which extend at varying angles with respect to the workpiece axis (A), the cutter plate (60) is rotated in such manner about the workpiece axis (A) during the machining of a flank (64) adjacent a cutting edge (66) that the point at which the electrode wire (50) intersects the cutting edge (66) always lies on a tool axis (E) which extends at right angles to the electrode wire (50) and to two axes (X, Y) of the coordinate system, and further characterized in that the electrode wire (50) is rotated about the tool axis (E) during the machining of portions of the flank (64) which are located adjacent portions of the cutting edge (66) not in parallel with the workpiece axis (A).

2. A machine for electric discharge machining of cutter plates (60) having a cutting edge (66) parts of which extend at varying angles with respect to a workpiece axis (A), said cutting edge (66) being formed by a flank (64) and an adjacent face (62) of the cutter plate (60), the machine comprising a mount (26) for at least one cutter plate (60),
a program controlled motor (28) for rotating the cutter plate (26) about said workpiece axis (A),
a wire fixture (46) over which an electrode wire (50) is guided, and
a carriage arrangement (14, 18, 34) with program controlled drives for rectilinear relative movements between the cutter plate (60) and the electrode wire (50) along the three axes of a rectangular coordinate system, characterized in that the wire fixture (46) is rotatable under program control about a tool axis (E) which extends at right angles to the electrode wire (50) and to two axes (X, Y) of the coordinate system said wire fixture (46) being rotationally adjustable with respect to said mount (26) in such manner that the electrode wire 50, when machining the flank (64) of the cutter plate (60), intersects the cutting edge (66) in a point lying on said tool axis (E).

3. The machine as claimed in claim 2, characterized in that wire fixture (46) is disposed on a rotary member (44) which is rotatable about the tool axis (E) and further carries a sensor (56) for measuring contours and surfaces of the cutter plate (60).

* * * * *

UNITED STATES PATENT AND TRADEMARK OFFICE
CERTIFICATE OF CORRECTION

| | |
|---|---|
| PATENT NO. : | 5,326,954 |
| DATED : | July 5, 1994 |
| INVENTOR(S) : | Peter Lenard et al. |

It is certified that error appears in the above-identified patent and that said Letters Patent is hereby corrected as shown below:

On title page, item [57] Abstract line 11, change "intersects" to -- touches --.

In column 3, line 18, change "angle e" to -- angle $\alpha$ --.

Signed and Sealed this

Eighth Day of November, 1994

Attest:

BRUCE LEHMAN

Attesting Officer

Commissioner of Patents and Trademarks